Dec. 4, 1934.  R. STEVENSON  1,982,768
GEARING
Filed Sept. 15, 1930   3 Sheets-Sheet 3

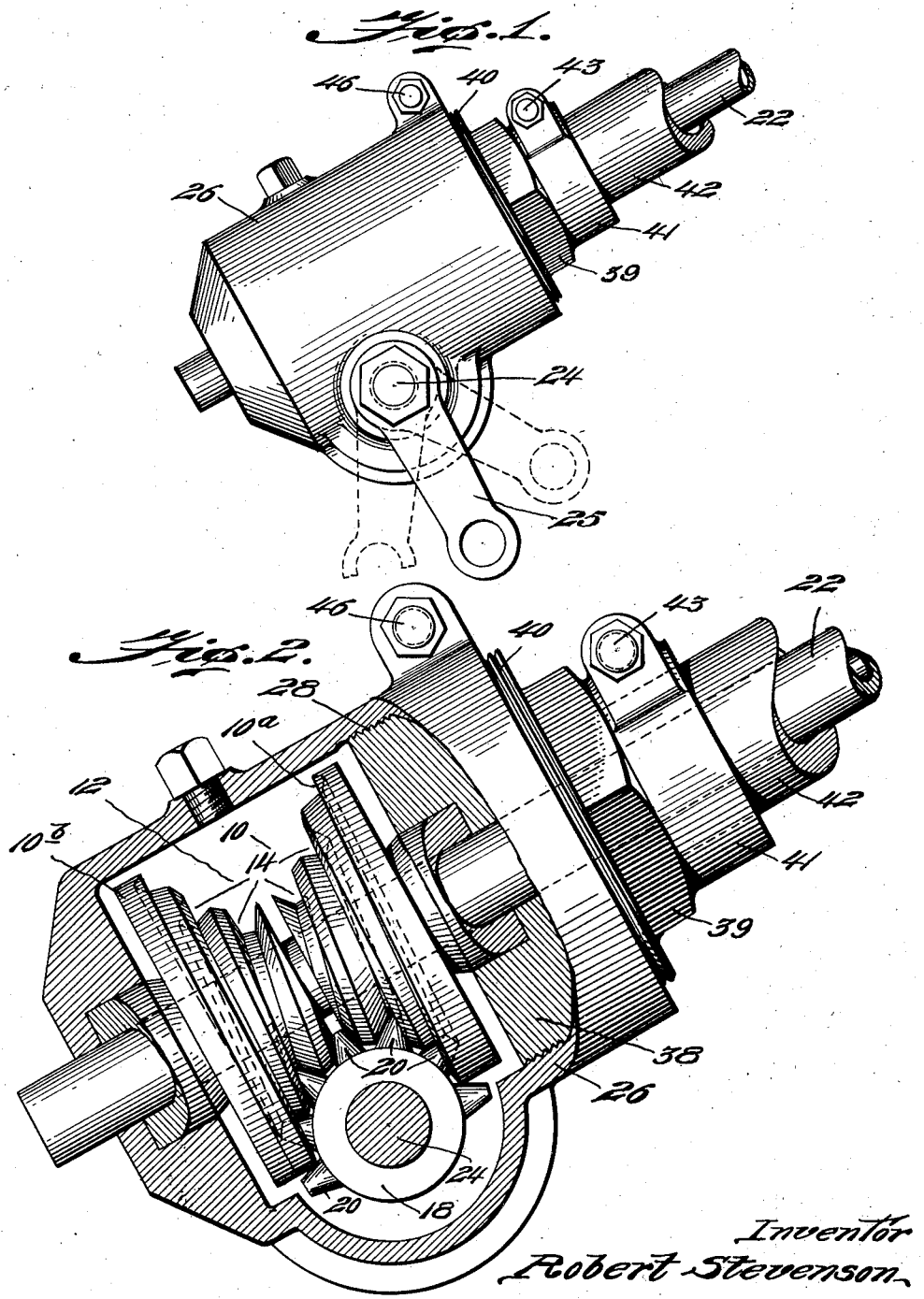

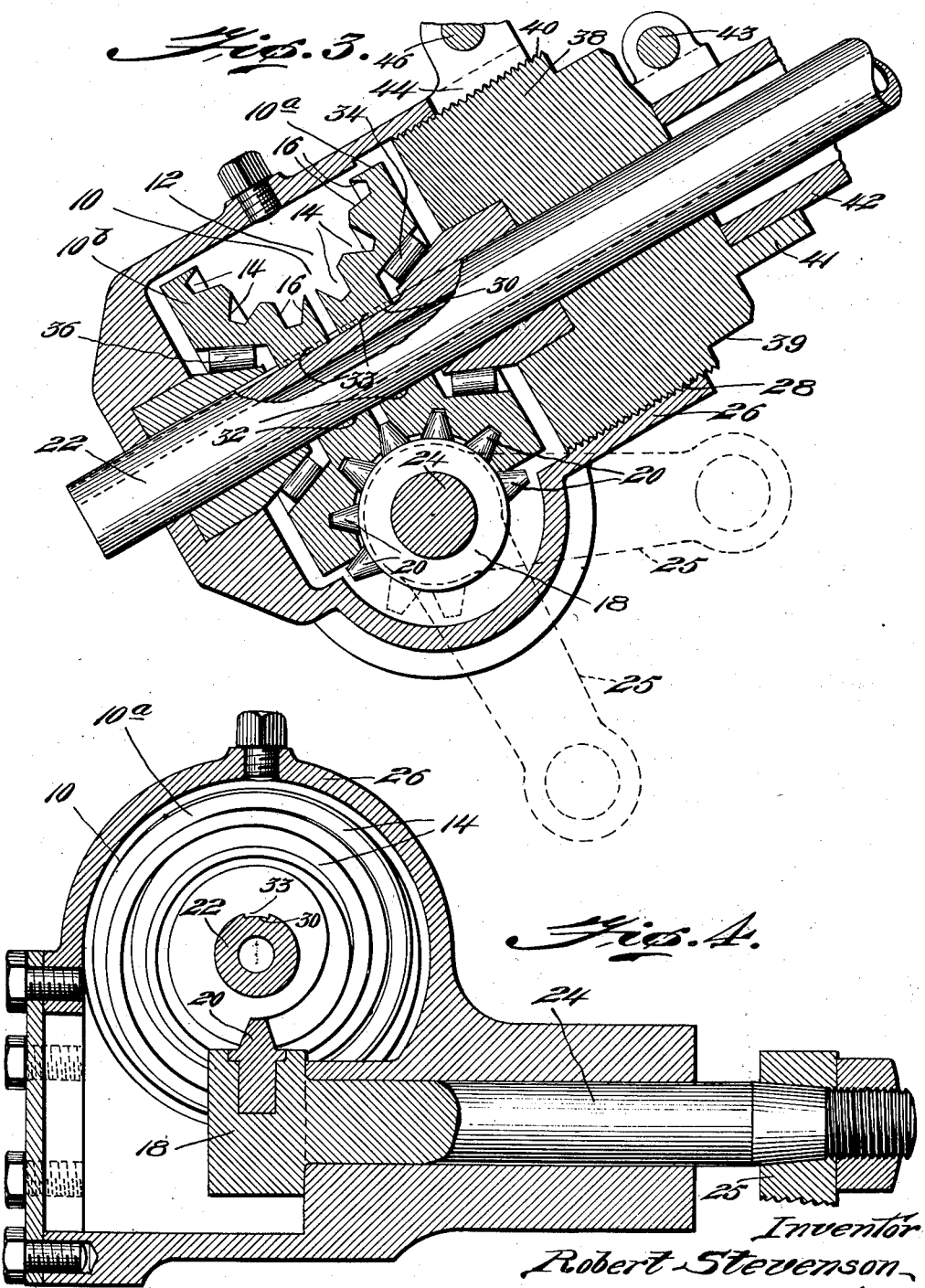

Inventor
Robert Stevenson
By Thomas A. Jenckes Jr.
Attorney

Patented Dec. 4, 1934

1,982,768

UNITED STATES PATENT OFFICE 1,982,768

GEARING

Robert Stevenson, West Barrington, R. I., assignor to M & S Manufacturing Co. Inc., Providence, R. I., a corporation of Rhode Island Application September 15, 1930, Serial No. 481,953

4 Claims. (Cl. 74—458)

My invention relates to improvements in gearing, particularly of the type where one member is used to rotate another at substantially right angles thereto, and where it is desired that the second member be not able to rotate the first member. While my invention may be used for various purposes, it is particularly adapted for use in steering mechanisms, particularly those of the type adapted for use in automobiles, motorboats, aeroplanes, etc.

I preferably employ a worm on the steering shaft or other shaft employed, and a worm gear on the crank shaft or other shaft employed for moving the steering rods or other mechanism and one feature of my invention relates to the specific construction of worm and worm gear employed for this purpose. Where a circular worm gear and a circular worm are employed, it is obvious that due to their inherent construction, only a very small portion of the periphery of the worm gear can be in mesh with the worm at the same time. In order that a greater number of worm gear teeth may enmesh with the teeth on the worm, I provide preferably a hemitorical concavity in the side wall of the worm and provide a continuous spiral groove in said concavity preferably of constant pitch along the surface of said concavity and preferably inclined so as to be radial relative to the center line of said concavity, and I preferably employ a cooperating worm gear of a radius substantially equal to that of the concavity, having a plurality of spaced preferably stud teeth of a pitch substantially equal to that of the groove on the periphery of the worm riding in said groove.

In the specification and claims I employ the word "torical" to signify "of torus shape". With this construction it is obvious that a larger portion of the periphery of the worm gear, by means of its plurality of teeth will be in mesh with the groove in the torical concavity on the worm.

Even supposing, that in a cylindrical worm, a plurality of worm gear teeth are in mesh therewith, inasmuch as the periphery of the worm gear is circular, whereas the intermeshing side of the worm is cylindrical, it is obvious that one tooth only will sink its full depth into the worm groove, whereas the other teeth will only be partially in the groove. With my construction, however, it is obvious that all of the contacting teeth in the worm gear will be completely in mesh with the teeth of the worm at all times.

Inasmuch as in my construction the plurality of teeth on the worm gear are in mesh with the groove on the worm it is obvious that I have provided a much stronger structure than any provided hitherto, because in my preferred embodiment the teeth on substantially half of the periphery of the worm gear are in mesh with the groove in the worm. In general, my invention is an improvement on the so-called Hindley type of gearing. Whereas the Hindley type of gearing had a concavity in the worm, the teeth on the worm gear were constructed with a plurality of straight circular rib threads extending around the periphery thereof thus providing plane contacts with the sides of the groove. In practice it has been found that these circular teeth have not worked efficiently with a worm of this description. In addition, in the Hindley gear, the pitch has not been taken along the arcuate line of the concavity, which has prevented the groove from being inclined so as to be radial relative to the center line of said concavity.

I believe that I am the first, therefore, to provide a worm of this description in which the grooves are cut in underneath their outer peripheral portion in my preferred embodiment so as to be radial relative to the center line of the concavity. This provides, in my improved type of worm an irreversible feature which will be described in more detail later.

A further feature of my invention relates to the fact that I employ in my worm gear which as stated is preferably of a radius substantially equal to that of the concavity, preferably a plurality of spaced stud teeth having curved or otherwise broken side walls so as to provide line contacts with the sides of the groove of a pitch substantially equal to that of the groove on at least, preferably half of the periphery thereof to ride in said groove. Whereas, an ordinary rib tooth with flat sides as normally employed on a worm gear has difficulty in getting out of mesh with a straight Hindley type of worm, by employing, preferably frustro-conical stud teeth or other teeth having line contacts only with the side walls of the groove, it is obvious that they may readily ride out of the groove. By employing this construction, of having a grooved worm with the groove of the worm inclined so as to be radial relative to the center line of the concavity and with the line contact stud teeth on the worm gear, I am enabled to achieve a new result. When one of the studs reaches a portion of the groove so inclined that the turning component of the force exerted by the worm gear will not overcome the worm friction to turn the worm, it is obvious that movements of the worm gear that connects the crank shaft will not cause movement of the worm and steering rod, thus providing in a steering mechanism a very desirable feature and preventing the wheel from turning, when an extraordinary force is exerted on the crank shaft, such as by the bursting of a tire.

I am aware that others have attempted to do this by constructing the cooperating ordinary worm and worm gear on the steering rod and crank shaft of very low pitch. With my construction, however, it is possible to provide a fast pitch on the steering rod worm and the crank shaft worm gear thus making the relative movement of the two shafts quicker or the braking torque exerted by the crank shaft greater on a smaller turning of the steering wheel.

In addition, I preferably employ a plurality of stud teeth, preferably extending more than half way around the periphery of the worm gear and the degree of angularity of the groove changes from right angles when in the center of the concavity, to parallel with the axis of the steering rod at the extremities of the concavity so that near the ends of the groove any leverage applied to the crank shaft has no effect in turning the worm on the steering rod even when a single tooth is employed and that reaches the extremity of the groove. This is particularly true where a plurality of stud teeth are employed as in my preferred embodiment. In an ordinary worm and worm gear, the pitch line of the worm is straight, that of the worm gear circular. In my improved device, the pitch of both the worm concavity and the worm gear are coincident and circular and I preferably employ the center line of the hemi-torical concavity substantially coincident with the extended theoretical side wall of the worm before the concavity is cut. It is obvious that the center line of the torical cavity may be moved out and hence any size or partially torical concavity may be produced, although I have found best results are attained when a substantially hemi-torical concavity is employed.

A further feature of my invention relates to the fact that I preferably split my improved worm into two relatively adjustable portions, along the axis of said concavity and I provide means to make one of these split worm portions adjustable relative to the worm gear and to move towards the other section to take up play and backlash between the worm gear and worm portions.

Instead of employing a substantially hemi-torical concavity, grooved in the manner heretofore explained, in the side wall of the worm, it is obvious that I may employ a substantially quarter-torical concavity in an end corner of a cylindrical worm; thus providing, in the finished article, the equivalent of a half portion of centrally split hemi-torical concaved worm and it is apparent that while my invention will not function so perfectly with only substantially a half of my preferred worm, it is obvious that such construction will have many of the advantages thereof.

Further features of my invention relate to the specific means I employ for housing the worm on the lower end of the steering rod and the adjacent portion of the crank shaft and providing means in said housing for adjustment for play and backlash of the worm or worm sections.

A further object of my invention is to distribute the wear of the steering mechanism more evenly over a relatively larger number of teeth than formerly thereby lessening the wear and consequent backlash caused thereby.

A further object of my invention is to assist in taking the "shimmy" out of the steering wheel and to lessen the road shocks before they are transmitted to the steering wheel. These and such other objects of my invention as may hereinafter appear will be best understood from a description of the accompanying drawings which illustrate various embodiments thereof.

In the drawings, Fig. 1 is a perspective view of the exterior of a housing for the lower end of the steering wheel and connecting portions of the crank shaft employing my invention. Fig. 2 is an enlarged side elevation thereof, with a portion of the housing wall broken away, to illustrate in elevation my improved worm and worm gear.

Fig. 3 is a longitudinal section of the mechanism shown in Fig. 2.

Fig. 4 is a cross-sectional view of such a steering mechanism taken through the center of the worm gear and showing the groove on the upper worm portion in elevation.

Figure 5:
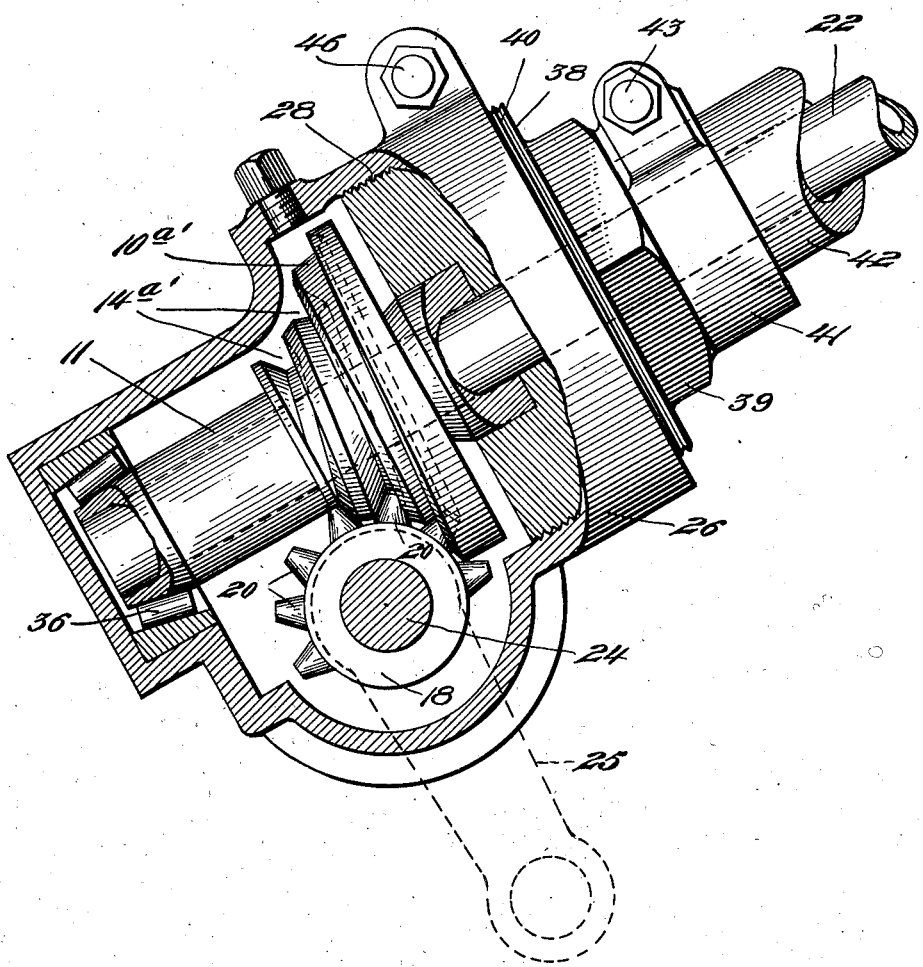
Fig. 5 is a view generally similar to Fig. 2 of an embodiment of my invention employing only substantially half of the worm shown in the previous embodiment.

In the drawings, wherein like characters of reference indicate like parts throughout, 10 generally indicates a worm constructed in accordance with my invention. As stated hitherto, while my improved type of worm is particularly adapted for use in cooperation with my improved type of worm gear, for transmitting rotary movement between two shafts at right angles to each other, it has certain inherent features of construction novel to worms and may be employed in any place where it is possible to use a worm of this description. My improved worm 10 comprises a cylinder having a partially torical concavity 12, preferably a hemi-torical con-cavity in the side wall thereof. It is obvious that if it is a true hemi-torical con-cavity, the center line thereof, will be approximately in the center of the cylinder wall in which the concavity is cut. If, however, the center line thereof is exterior of the cylinder, it is obvious that it will not be a true hemi-torical con-cavity but merely a partially torical con-cavity.

In my preferred embodiment, said concavity 12 is provided with a cam groove 14 winding as a modified helix. Most worm gears are provided with a true helical cam groove of a linear pitch along the side of the cylinder. In my improved embodiment, however, I employ a cam groove 14 of the con-cavity 12 of constant circular pitch along the arcuate line of said con-cavity.

A further feature of my invention relates to the fact that I preferably incline the side walls 16 of said groove so that they will be radial relative to the center line of the con-cavity. I also preferably split my improved worm into two portions, 10ᵃ and 10ᵇ adjustable relative to each other and preferably split along the plane of the center line of the con-cavity. As shown in Fig. 5, merely one of my improved half worm portions such as the worm 10ᵃ' may be employed as the torque transmitting worm. In this case the worm 10ᵃ' will comprise a cylinder having a quarter or partial torical con-cavity 12' in an end corner thereof with the center line thereof preferably in the plane of the end wall of the cylinder and having a cam groove in said con-cavity inclined so as to be radial relative to the center line of the con-cavity.

As shown in Fig. 5, the worm 10ᵃ' may be provided with the downwardly projected extension 11 for a purpose later to be described.

Where my improved worm 10 may be employed in any desired manner, it is particularly designed to be employed in connection with a novel type of worm gear 18. The worm gear 18 is preferably of a radius substantially equal to that of the concavity and is preferably provided with a plurality of spaced preferably frustro-conical stud teeth 20 of a circular or arcuate pitch substantially equal to that of the groove in the worm and preferably provided on at least half of the periphery thereof and adapted to ride in said groove in the worm. It is obvious that inasmuch as the side walls 16 of the groove are inclined so as to be radial relative to the center line of the concavity, that they will project outwards and over their base at the outer portion of the groove. As distinguished from the Hindley gear therefore, I believe that I am the first to provide a worm having such an inclined groove so as to interlock with the stud teeth on the worm gear. It is thus apparent that the center portion of the groove 14 will be at approximately right angles to the steering rod or the other shaft 22 on which the worm is mounted but that as the groove extends outwards on the concavity, near the end thereof, it will be substantially parallel to the axis of the shaft 22, so that with this construction as a stud 20 rides outwardly on the groove, it may reach a portion of the grooves so inclined that the turning component of the force exerted by the worm gear, will not overcome the worm friction to cause the worm gear to turn the worm.

As a stud tooth approaches the outer portion of the worm groove, it is obvious that the chief component of the force exerted thereby will be towards the axis of the shaft 22 and not lengthwise thereof to cause a turning movement, and the lengthwise component will become so small that it will be impossible for movement of the worm gear 18 to turn the worm 12.

Where a plurality of studs are employed on the worm gear, as there will always be a substantial number in the groove in each side of the concavity, it is obvious that this locking action will be increased and will be substantially positive at any relative position of the worm and worm gear, particularly if the stud teeth extend around more than half the periphery of the worm gear. While the sides of the groove 14 and the studs 20 may be perpendicular, I preferably construct both the groove 14 with inclined outwardly flaring side walls and the studs 20 so that they may be frustro-conical or with curved side walls to provide a line contact with the sides of the groove to insure a closer binding action of the studs within the groove than hitherto. While my improved worm and worm gear may be used for connecting any transmittal of movement between two shafts preferably at right angles to each other, it is particularly designed and adapted for use for transmitting movement in a steering mechanism between the steering rod 22 thereof and the crank arm or shaft 24 thereof, and I have shown in the drawings an embodiment of my invention particularly adapted for this purpose. To this end, I provide the substantially cylindrical housing 26 for the lower end of the steering rod 22 and I provide said housing with the upper end internally threaded as at 28. The crank shaft 24 projects through said housing at right angles and adjacent to said steering rod. The crank shaft 24 is provided with the usual torque arm 25 to which the steering mechanism rods may be attached as usual.

My improved worm gear 10 is mounted within the housing 26 so as to have the lower section $10^b$ thereof in the lower end of the housing and the upper section $10^a$ immediately above it and my improved worm gear is mounted on the crank shaft 24 so that the studs 20 thereof intermesh with the groove 14 on the worm. The lower end of the steering rod 22 within the housing 26 is grooved as at 30 substantially the length of the housing and the interior of each of the worm sections $10^a$ and $10^b$ is provided with a central key 33 projecting inwardly therefrom adapted to ride in said groove so as to permit the sections $10^a$ and $10^b$ to be non-rotatably mounted on said steering rod 22 yet axially movably thereon.

The lower end of the housing is provided with a bearing, preferably a roller bearing 36 on which the lower split worm portion $10^b$ may ride. This roller bearing may project obliquely upwards into the interior of the split gear portion $10^b$ or obliquely downwards into the housing, in the embodiment shown, projecting obliquely upwards from the lower end of the housing into the split worm portion $10^b$.

I provide a cylindrical adjusting block 38 externally threaded as at 40 adapted to be threadedly contained in the upper end of said housing and provided with an adjusting plug preferably of hexagonal shape 39 for a wrench to fit on the upper end thereof projecting upwardly therefrom and a split ring 41 projecting integrally upwardly from said plug 39. The steering rod is provided with the usual stationary tube 42 projecting downwardly from the wheel and rigidly attached to a portion of the automobile frame.

The upper split worm section $10^b$ is slidably splined to the steering rod 22 by the keys 33 thereof riding in the groove 30 in the steering rod. A cooperating set of oblique preferably roller bearings 34 are provided between the upper end of the split worm section $10^a$ and the lower end of the adjusting block 38, and in the embodiment shown these extend obliquewardly downwardly into the upper split worm portion $10^a$. The upper end of the housing 26 is split as at 44 and is provided with means such as a locking bolt 46 for adjustably securing the split portions together around said adjusting block.

It is thus obvious that on turning the preferably hexagonal plug 39 on the upper end of the block 38 by a wrench or other suitable tool that said block may be screwed downwardly of the upper portion of said housing to force the upper split worm portion $10^a$ downwards against the worm gear 18 and the lower split worm portion $10^b$ to adjust said split worm portions, worm gear and bearings for play and backlash. In practice the split sections $10^a$ and $10^b$ are spaced apart sufficiently so as to form a continuous groove between them perpendicular to the steering rod and a continuation of the groove 14 in which one or all of the teeth 20 may ride. The sections are thus so split and adjusted as to form a continuous groove of even pitch throughout.

When the adjusting block 38 has been screwed down a sufficient amount to adjust the sections $10^a$ and $10^b$ for play and backlash and bearings for play and backlash, it is obvious that the adjusting block 38 may be locked in adjusted position by tightening the adjusting bolt 46 to bring the upper portion of the housing each side of said split 44 together to tightly lock the block 38 in position and that the split ring 41 projecting upwardly from said block may be tightened around the lower end of the stationary tube 42 by the tightening of the adjusting bolt 43 and joining the split sections thereof together, to secure the upper end of the block to the lower end of said stationary tube.

If desired, the type of worm shown in Figs. 1 to 4 employing a hemi or partially-torical concavity and suitable groove cut therein may not be split but the groove may be formed continuously therein.

While I preferably employ a hemi-torical concavity in the side wall of the worm, I may as shown in Fig. 5 employ as the worm one only of the split worm portions shown in Fig. 2, in which case I provide the lower end thereof with an extension 11 suitable to ride on the ball bearings 36 in the lower end of the housing 26 and such a gear is suitable for many purposes, although it is not quite so definite in its locking action as that in the embodiments shown in Figs. 1 to 4. Where only one stud tooth 20 is employed, in adjusting the upper section 10ᵃ for play and backlash, it is obvious that the crank shaft 18 will have to be so turned that the stud 20 will lie between the two sections 10ᵃ and 10ᵇ.

It is thus apparent that I have provided a novel type of worm with the advantages portrayed above and particularly adapted for use in combination with the novel type of worm gear and particularly adapted for use as shown as a torque transmitting connection between one shaft, preferably a steering rod and a shaft to apply torque for steering or other mechanism, and the novel type of means for adjusting such a mechanism for play and backlash as heretofore described.

It is understood that my invention is not limited to the specific embodiments shown and that various deviations may be made therefrom without departing from the spirit and scope of the appended claims.

What I claim is:—

1. In combination a worm having a partially torical concavity in the side wall thereof having a cam groove in said concavity along the arcuate line of said concavity with the outer side wall thereof undercut toward the outer edge of said groove relative to planes perpendicular to the axis of the worm, said cam groove extending on both sides of the plane through the minimum diameter of the worm, and a cooperating worm gear of a radius substantially equal to that of the concavity having a tooth on the periphery thereof riding in said groove and having curved side walls to form line contacts with the side walls of the groove.

2. In combination, a worm having a partially torical concavity in the side wall thereof and having a cam groove in said concavity along the arcuate line of said concavity with the outer side wall thereof undercut toward the outer edge of said groove relative to planes perpendicular to the axis of the worm, said cam groove extending on both sides of the plane through the minimum diameter of the worm, and a cooperating worm gear of a radius substantially equal to that of the concavity having a plurality of spaced teeth of a pitch substantially equal to that of the groove riding in said groove and having curved side walls to form line contacts with the side walls of the groove.

3. In a worm gearing, a worm comprising a cylinder having a curved concavity therein and having a cam groove in said concavity with the outer side wall thereof undercut toward the outer edge of said groove relative to planes perpendicular to the axis of the worm, a cooperating worm gear of a radius substantially equal to that of the concavity having a tooth on the periphery thereof riding in said groove having curved side walls to form line contacts with the side walls of the groove.

4. In a worm gearing, a worm comprising a cylinder having a curved concavity therein and having a cam groove in said concavity with the outer side wall thereof undercut toward the outer edge of said groove relative to planes perpendicular to the axis of the worm, a cooperating worm gear of a radius substantially equal to that of the concavity having a plurality of teeth on the periphery thereof riding in said groove having curved side walls to form line contacts with the side walls of the groove.

ROBERT STEVENSON.